United States Patent
Korenaga et al.

(10) Patent No.: US 8,149,510 B2
(45) Date of Patent: Apr. 3, 2012

(54) DIFFRACTIVE OPTICAL ELEMENT AND METHOD OF MAKING THE SAME

(75) Inventors: Tsuguhiro Korenaga, Osaka (JP); Seiji Nishiwaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 451 days.

(21) Appl. No.: 12/529,207

(22) PCT Filed: Jan. 28, 2009

(86) PCT No.: PCT/JP2009/000319
§ 371 (c)(1),
(2), (4) Date: Aug. 31, 2009

(87) PCT Pub. No.: WO2009/098846
PCT Pub. Date: Aug. 13, 2009

(65) Prior Publication Data
US 2010/0110548 A1    May 6, 2010

(30) Foreign Application Priority Data
Feb. 6, 2008    (JP) ................................. 2008-026508

(51) Int. Cl.
*G02B 5/18* (2006.01)
*G02B 3/08* (2006.01)
(52) U.S. Cl. ....................................... 359/576; 359/743
(58) Field of Classification Search .................. 359/565, 359/571, 576, 742, 743
See application file for complete search history.

(56) References Cited

U.S. PATENT DOCUMENTS

| | | | |
|---|---|---|---|
| 5,257,132 A * | 10/1993 | Ceglio et al. | 359/565 |
| 5,847,877 A | 12/1998 | Imamura et al. | |
| 2005/0265151 A1 | 12/2005 | Kimura et al. | |
| 2006/0146422 A1 | 7/2006 | Koike | |
| 2009/0225215 A1 * | 9/2009 | Korenaga et al. | 348/340 |

FOREIGN PATENT DOCUMENTS

| | | |
|---|---|---|
| JP | 09-127321 | 5/1997 |
| JP | 11-142614 | 5/1999 |
| JP | 2006-012394 | 1/2006 |
| JP | 2007-291195 | 11/2007 |
| WO | 2006/040902 | 4/2006 |
| WO | 2007/026597 | 3/2007 |
| WO | 2007/132787 | 11/2007 |

OTHER PUBLICATIONS

International Search Report for corresponding application No. PCT/JP2009/000319 mailed Apr. 7 2009.

* cited by examiner

*Primary Examiner* — Alessandro Amari
(74) *Attorney, Agent, or Firm* — Renner, Otto, Boisselle & Sklar, LLP (57) ABSTRACT

A diffractive optical element according to the present invention includes: a lens body 11 with a blazed grating 13 on an aspheric surface 11a thereof; and an optical adjustment layer 15 that covers the diffraction grating 13. The lens body 11 is made of a first material 14a and the optical adjustment layer 15 is made of a second material 14b that has a higher refractive index than the first material 14a. The diffraction grating 13 has a number of ring zones that are arranged concentrically around an optical axis, where the height of each ring zone with respect to the aspheric surface 11a of the lens body 11 is represented by an increasing function of a distance r from the optical axis. The increasing function is represented by a phase polynomial that uses the distance r as a variable and that has a magnitude of $3/4\pi$ to $7/4\pi$ when r=0.

10 Claims, 8 Drawing Sheets

DIFFRACTIVE OPTICAL ELEMENT AND METHOD OF MAKING THE SAME

TECHNICAL FIELD

The present invention relates to a diffractive optical element that can condense white light efficiently and that can be mass-produced and also relates to a method of making such an optical element.

BACKGROUND ART

Recently, as digital technologies have been advancing even farther, various kinds of electronic devices for capturing and processing image information digitally, including digital cameras and camcorders, have had their performance further enhanced in the fields of mobile telecommunications and other IT-based consumer electronics. And the higher the performance of those cameras, camcorders, and other electronic devices, the more and more essential it is to reduce the weight, thickness and cost of lenses and other optical members or systems to be used in those devices.

If a condenser lens for use in the optical system of such a camera or camcorder is implemented as a diffractive optical element, then there is no need to use multiple aspheric lenses with a complex surface shape. That is why by providing a diffraction grating on the surface of a lens body, the condenser lens, and eventually the overall optical system, can have their weight and thickness reduced. Furthermore, even a condenser lens for optical discs to be used in a broad wavelength range (e.g., in the visible radiation range of approximately 400-700 nm) can also be a single diffractive optical element. That is why just by adopting a diffractive optical element, white light can be condensed efficiently and the optical system can also be simplified and have its weight and cost reduced.

Meanwhile, if white light or any other light falling within a broad wavelength range impinges on such a lens for imaging, unwanted diffracted light could be produced, a flare or a ghost could debase the image quality, or an MTF (modulation transfer function) characteristic could deteriorate. To avoid such deterioration in characteristic, according to a well known technique, the surface of a lens body with a diffraction grating is coated with a layer of an optical material that has a different refractive index and a different dispersion of refractive indices from the lens body. Such a coating layer can be formed by either applying the optical material onto the surface of the lens body or bonding a film of the optical material onto the surface of the lens body.

In a diffractive optical element that has such a coating layer on the lens body, a diffraction grating depth d, at which the first-order diffraction efficiency becomes 100%, is theoretically given by the following Equation (1):

$$d = \frac{\lambda}{|n1(\lambda) - n2(\lambda)|} \quad \text{Equation (1)}$$

where $n1(\lambda)$ is the refractive index of the material of the lens body and $n2(\lambda)$ is the refractive index of the material of the coating layer. Both of these indices are a function of the wavelength $\lambda$.

If the right side of Equation (1) becomes constant in the wavelength range used, then the diffraction efficiency will no longer have wavelength dependence in that wavelength range, theoretically speaking. That is why if the lens body and the coating layer of a diffractive optical element are a combination of a material with a high refractive index and low wavelength dispersion and a material with a low refractive index and high wavelength dispersion, then the wavelength dependence of the diffraction efficiency can be reduced. As a result, a condenser lens that can condense even white light efficiently enough can be implemented as a diffractive optical element.

In such a diffractive optical element in which a number of optical material layers are stacked one upon the other and a relief pattern is provided in their interface, a configuration for reducing the wavelength dependence of diffraction efficiency and effectively preventing the occurrence of a flare due to color unevenness or light of unnecessary orders was proposed in Patent Document No. 1, for example. According to such an example, the lens body is made of optical glass as a high refractive index, low wavelength dispersion material, while the coating layer is made of either optical glass or an optical material of resin as a low refractive index, high wavelength dispersion material.

As for an optical system for an optical pickup for optical discs, it was proposed that a diffractive optical element that achieves high optical efficiency in the vicinity of each of 400 nm, 650 nm and 780 nm be used as an objective lens (see Patent Document No. 2, for example). In such an example, the lens body is made of optical glass as a high refractive index, low wavelength dispersion material, while the coating layer is made of an optical material of resin as a low refractive index, high wavelength dispersion material. In the interface between the lens body and the coating layer, a phase structure with concentric ring steps is arranged. The diffractive optical element with such a configuration realizes an objective lens that achieves high optical efficiency in each of the three wavelength ranges mentioned above.

In the conventional diffractive optical element that can condense white light efficiently (which will be referred to herein as a "white diffractive optical element"), a diffraction grating is formed by a compaction process on the aspheric surface of the lens body that is made of optical glass with a high refractive index and low wavelength dispersion, and then the surface is coated with a film of resin with a low refractive index and high wavelength dispersion. In such a white diffractive optical element thus formed, the diffraction grating itself has positive condensing power and the lens body with a high refractive index is coated with a resin layer with low wavelength dispersion. That is why a cross section of the diffraction grating has blazed steps, which define a decreasing function that steps down outward from the optical axis.

Patent Document No. 1: Japanese Patent Application Laid-Open Publication No. 9-127321

Patent Document No. 2: Japanese Patent Application Laid-Open Publication No. 2006-12394

DISCLOSURE OF INVENTION

Problems to be Solved by the Invention

In such a conventional white diffractive optical element, the lens body is made of optical glass, not resin. That is why a die for forming the diffraction grating by a compaction process cannot be used so many times. In addition, the resin of the coating layer to cover the lens body cannot adhere to the diffraction grating on the lens body strongly or reliably enough, thus making it difficult to mass-produce it.

To overcome such a problem, if the lens body is not made of optical glass but a resin material that is easily patternable, a resin material, of which the refractive index is so much lower than that of the resin material of the lens body that it is possible to use it as a coating layer for a white diffractive optical element, needs to be used. In that case, as the lens body and the coating layer are both made of resin materials, the manufacturing process should be done more easily. However, since the resin material for the lens body usually has a smaller refractive index than optical glass, it is difficult to find a resin material, of which the refractive index is low enough to use it for a coating layer.

For that reason, from a different perspective from the conventional one, when the lens body of a white diffractive optical element was made of a resin material, the present inventors tentatively used a resin material, having a greater refractive index than the resin material for the lens body, to make the coating layer. Such a resin material could be a mixture of a resin base and a nanocomposite material, for instance. In that case, however, as the lens body and the coating layer will have their refractive index levels reversed, the diffraction grating should have a cross section with blazed steps, which define an increasing function that steps up outward from the optical axis.

Nevertheless, in such a white diffractive optical element with those blazed steps defining an increasing function, the distance from the optical axis of the white diffractive optical element to the nearest step to that optical axis is so long that some area of the diffraction grating that is close enough to the optical axis and that is covered with the coating layer will have a broad recess. As a result, a portion of the coating layer of resin that should fill the recess would have a great volume. If a white diffractive optical element is going to be fabricated so as to have such a structure, that portion of the coating layer that fills the recess could be deformed during the manufacturing process. And we discovered that particularly when the coating layer was formed by a cost-effective "pad printing process" that would usually contribute to mass production, that portion of the coating layer filling the recess tended to have a decreased thickness, thus causing a variation in MTF characteristic that was too significant to mass-produce white diffractive optical elements with good optical properties.

It is therefore an object of the present invention to provide a diffractive optical element, which can condense white light efficiently, of which the lens body of a resin material can have a diffraction grating formed by a mass-producible method, and of which the optical properties, including the MTF characteristic, are stabilized.

Means for Solving the Problems

A diffractive optical element according to the present invention includes: a lens body with a blazed grating on an aspheric surface thereof; and an optical adjustment layer that covers the diffraction grating. The lens body is made of a first material and the optical adjustment layer is made of a second material that has a higher refractive index than the first material. The diffraction grating has a number of ring zones that are arranged concentrically around an optical axis, where the height of each ring zone with respect to the aspheric surface of the lens body is represented by an increasing function of a distance r from the optical axis. The increasing function is represented by a phase polynomial that uses the distance r as a variable and that has a magnitude of $3/4\pi$ to $7/4\pi$ when $r=0$.

In one preferred embodiment, if the diffraction grating has a step height d, the height $d_0$ of the ring zone at the distance $r=0$ falls within range $3d/8 \leq d_0 \leq 7d/8$.

In another preferred embodiment, the first material is a first resin material and the second material is a second resin material.

In this particular preferred embodiment, the second material includes fine particles that are dispersed in the second resin material.

In that case, the fine particles are inorganic particles and the second resin material is a photocurable resin.

In a specific preferred embodiment, the inorganic particles are made of at least one material that is selected from the group consisting of zirconium oxide, aluminum oxide and yttrium oxide.

In another preferred embodiment, the first material is at least one material that is selected from the group consisting of polycarbonate resins, polystyrene resins, and fluorene polyester resins.

In yet another preferred embodiment, the aspheric surface is raised in a direction in which a light ray travels along the optical axis.

In this particular preferred embodiment, the surface of the lens body without the diffraction grating is an aspheric surface that is depressed in the direction in which the light ray travels along the optical axis.

A method of making a diffractive optical element according to the present invention includes the steps of: providing a lens body that has an aspheric surface, on which a blazed grating has been formed, and that is made of a first resin material; and forming an optical adjustment layer on the diffraction grating by a pad printing process using a second resin material that has a higher refractive index than the first resin material. The diffraction grating has a number of ring zones that are arranged concentrically around an optical axis, where the height of each ring zone with respect to the aspheric surface of the lens body is represented by an increasing function of a distance r from the optical axis. The increasing function is represented by a phase polynomial that uses the distance r as a variable and that has a magnitude of $3/4\pi$ to $7/4\pi$ when $r=0$.

Effects of the Invention

According to the present invention, an optical adjustment layer of resin can be formed in an appropriate shape by a pad printing process, for example, on a diffraction grating that has been formed on the curved surface of a lens body. Thus, the present invention provides a diffractive optical element that can have a reduced weight and thickness and that can be mass-produced with increased reliability and at a reduced cost.

In addition, by using the diffractive optical element of the present invention, various kinds of mobile telecommunications devices and other IT-based consumer electronics devices can have their size, thickness and weight further reduced and can also be manufactured at a reduced cost and with increased reliability.

BRIEF DESCRIPTION OF DRAWINGS

FIG. 4(a) is a schematic representation illustrating the first surface and its surrounding portion of a diffractive optical element according to a preferred embodiment of the present invention on a larger scale, while FIG. 4(b) illustrates a diffractive optical element that has been formed by a conventional design process.

DESCRIPTION OF REFERENCE NUMERALS

| | |
|---|---|
| 10, 30 | diffractive optical element |
| 11, 17a, 31 | lens body |
| 11a, 31a | first surface of lens body |
| 11b, 31b | second surface of lens body |
| 12, 32 | optical axis |
| 13, 33 | diffraction grating |
| 13a | blazed step |
| 14, 19, 34 | resin material |
| 14a, 34a | first material |
| 14b, 34b | second material |
| 15, 35 | optical adjustment layer |
| 15a | surface of optical adjustment layer |
| 16 | coating film |
| 17 | white diffraction grating |
| 18a, 18b, 36 | step |
| 19a | resin base |
| 19b | inorganic particles |
| 20 | plate |
| 20a | depression |
| 21 | dispenser |
| 22 | pad |
| 23 | fixing jig |
| 24 | atmosphere |
| 25 | UV light source |
| 25a | UV ray |

BEST MODE FOR CARRYING OUT THE INVENTION

Hereinafter, preferred embodiments of a diffractive optical element according to the present invention will be described with reference to the accompanying drawings.

Embodiment 1

First of all, a specific preferred embodiment of a diffractive optical element according to the present invention will be described.

Figure 1:
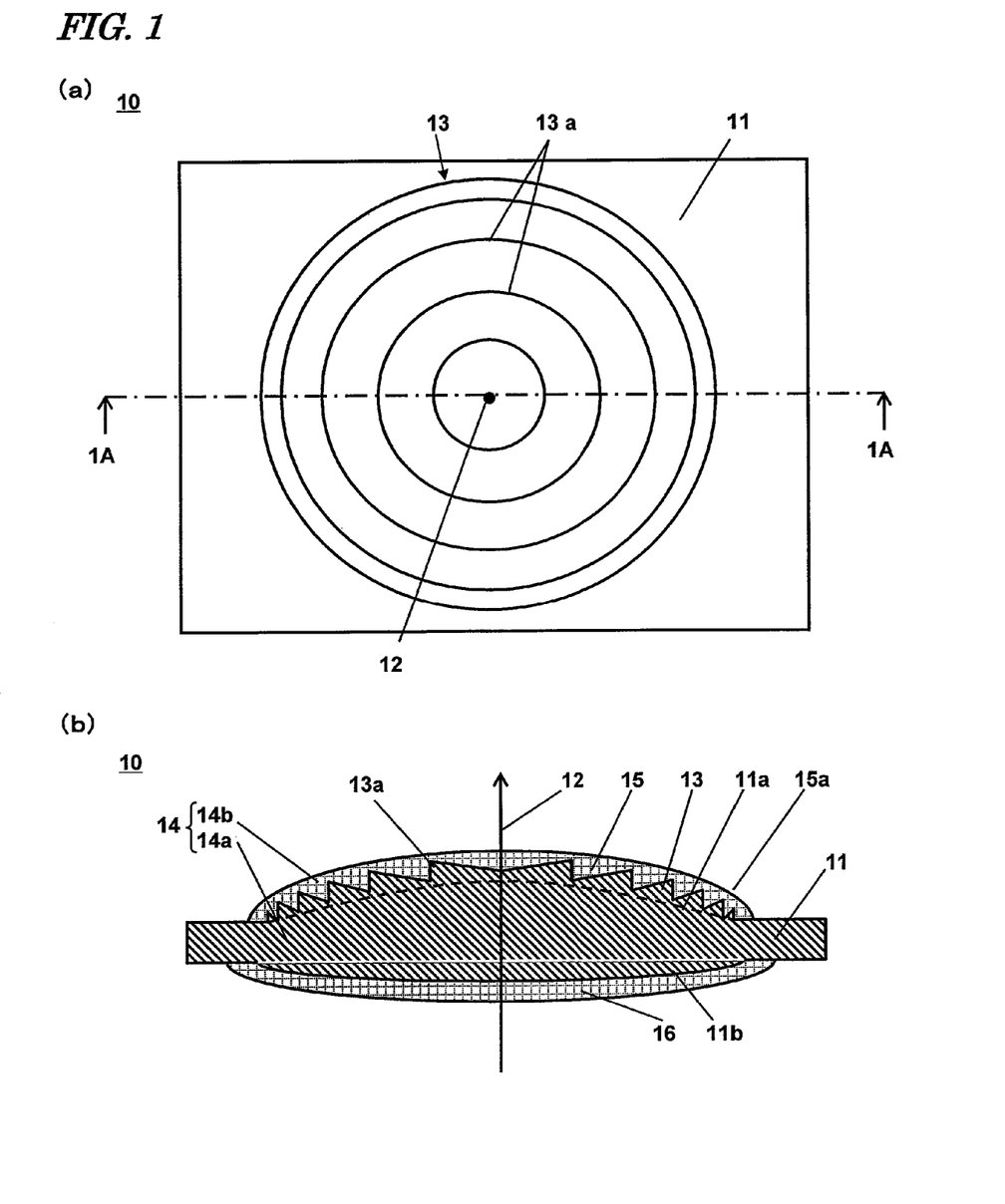
FIG. 1(a) is a plan view schematically illustrating a diffractive optical element as a specific preferred embodiment of the present invention.
FIG. 1(b) is a cross-sectional view thereof as viewed on the plane 1A-1A shown in FIG. 1(a).

Now look at FIG. 1 first. FIG. 1(a) is a plan view illustrating a diffractive optical element 10 as a first specific preferred embodiment of the present invention, and FIG. 1(b) is a cross-sectional view thereof as viewed on the plane 1A-1A shown in FIG. 1(a).

As shown in FIGS. 1(a) and 1(b), the diffractive optical element 10 of this preferred embodiment includes a lens body 11, which has a blazed grating 13 on its aspheric surface (which will be referred to herein as a "first surface 11a"), and an optical adjustment layer 15 that covers the diffraction grating 13. The lens body 11 is made of a first material 14a, while the optical adjustment layer 15 is made of a second material 14b that has a higher refractive index than the first material 14a. The first and second materials 14a and 14b will be sometimes referred to herein as a "resin material 14" collectively.

The diffraction grating 13 has a number of ring zones that are arranged concentrically around the optical axis 12. The diffraction grating 13 of this preferred embodiment could be regarded as forming an integral part of the lens body 11. That is to say, the surface of the diffraction grating 13 could be regarded as forming the real surface of the lens body 11. In this preferred embodiment, however, the first surface 11a of the lens body 11 is supposed to be a gently curved aspheric surface as indicated by the dashed curve in FIG. 1(b). Therefore, the "diffraction grating" will refer herein to a portion that is located between the first surface 11a of the lens body 11 and the surface of the diffraction grating 13 and that is made of the same material as the lens body 11.

The distance from the first surface 11a of the lens body 11 to the surface of the diffraction grating 13 will be referred to herein as the "height" of the diffraction grating 13. The height of the diffraction grating 13 increases or decreases according to the distance r from the optical axis 12. And each ring zone is divided where the height becomes a local minimum. It should be noted that a portion of a certain ring zone where its height becomes a local minimum is in contact with a portion of its adjacent ring zone where its height becomes a local maximum. Thus, a "step" is formed on that boundary. As shown in FIG. 1(a), a number of steps 13a are arranged concentrically around the optical axis 12.

The height of each ring zone with respect to the first surface 11a that is the aspheric surface of the lens body 11 is represented by an increasing function of the distance r from the optical axis 12. In this preferred embodiment, the increasing function that defines the height of each ring zone is represented by a phase polynomial that uses the distance r as a variable, and the phase polynomial has a magnitude of $3/4\pi$ to $7/4\pi$ when r=0, which is one of the most important features of the present invention. It will be described later what functions and effects will be achieved due to this feature.

As shown in FIG. 1(b), the lower surface of the optical adjustment layer 15 is contact with the surface of the diffraction grating 13 and the upper surface (or the principal surface) 15a of the optical adjustment layer 15 is substantially parallel to the aspheric surface 11a of the lens body 11.

The second surface 11b of the lens body 11, which is opposed to the first surface 11a thereof, also has an aspheric shape but has no diffraction grating and is covered with a coating film 16 made of a low wavelength dispersion material instead.

Figure 2:
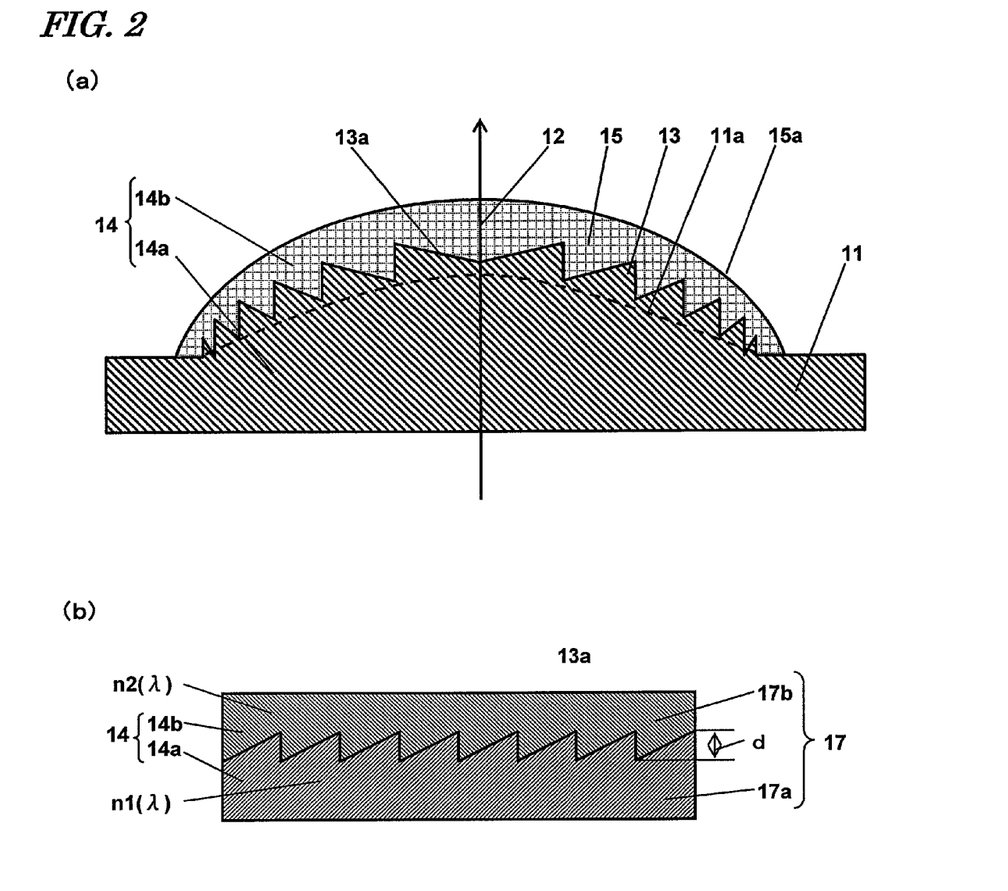
FIGS. 2(a) and 2(b) are a schematic representation illustrating the first surface of the diffractive optical element and its surrounding portion on a larger scale and a view illustrating the basic configuration of the white diffraction grating, respectively.

Now look at FIGS. 2(a) and 2(b), which are a schematic representation illustrating the first surface 11a of the diffractive optical element 10 shown in FIG. 1(a) and its surrounding portion on a larger scale and a view illustrating the basic configuration of the diffractive optical element 10, respectively.

There is a difference in refractive index between the diffraction grating 13 and the optical adjustment layer 15. Supposing the first surface 11a of the lens body 11 is flat, the configuration shown in FIG. 2(a) will be realized in principle. That is to say, a white diffraction grating 17 such as the one shown in FIG. 2(b) will be formed by a portion 17a made of the first material 14a with blazed unevenness and a portion 17b that is made of the second material 14b and that makes close contact with the former portion 17a. If the refractive indices of the first and second materials 14a and 14b are n1(λ) and n2(λ), the height of the steps is d, and the wavelength is λ, Equation (1) mentioned above is also satisfied in this preferred embodiment. And since Equation (1) is satisfied, the diffractive optical element 10 can condense light with high efficiency.

In the diffractive optical element 10 of this preferred embodiment, the lens body 11 is made of a resin material, and therefore, the diffraction grating 13 can be formed more easily on the lens body 11 compared to a situation where the lens body is made of a glass material. Also, by performing a process step of transferring the shape of the diffraction grating 13 onto the surface of the lens body 11 using a mold that defines the shape of the diffraction grating 13, the diffraction grating 13 can be formed with high size accuracy and good reproducibility. And even if such a transfer process step is repeatedly carried out a number of times using such a mold, the mold will be hardly worn and can be used a much greater number of times because what needs to be formed is resin. That is why when such diffractive optical elements 10 are mass-produced, the diffraction gratings 13 can still be formed just as designed, and therefore, can be covered with the optical adjustment layer 15 closely by a pad printing process.

Consequently, the diffractive optical element 10 of this preferred embodiment has a configuration that can have a reduced weight and thickness easily and can be mass-produced with increased reliability and at a reduced manufacturing cost.

To condense white light with high efficiency by using first-order diffracted light, according to this preferred embodiment, the refractive index of the second material 14b that makes the optical adjustment layer 15 is set to be higher than that of the first material 14a that makes the lens body 11, and the diffraction grating 13 is formed so as to have a blazed shape in which the respective ring zones have their heights increased outward from the optical axis 12.

Next, the cross-sectional shape of the diffraction grating 13 of this preferred embodiment will be described in detail with reference to FIGS. 3(a) and 3(b), which illustrate a conventional method of designing a blazed shape and a method of designing a blazed shape according to this preferred embodiment, respectively.

Figure 3:
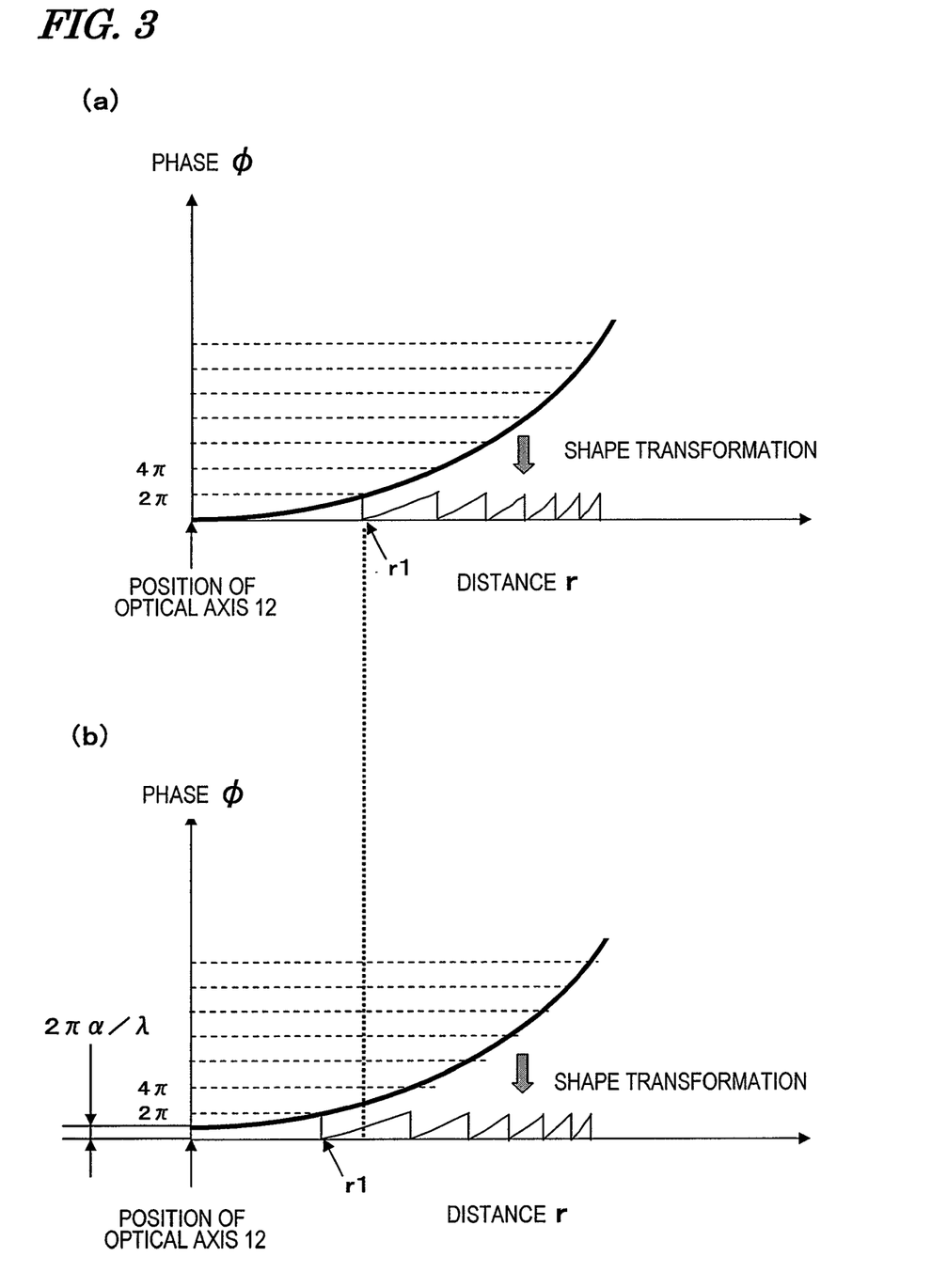
FIGS. 3(a) and 3(b) illustrate a conventional method of designing a blazed shape and a method of designing a blazed shape according to this preferred embodiment, respectively.

In FIGS. 3(a) and 3(b), the ordinate represents the phase φ and the abscissa represents the distance r from the optical axis 12 (see FIG. 2(a)). Also, in these drawings, the curve indicates the magnitude of phase shift produced by the diffraction grating and is represented by a phase polynomial f(r) that uses the distance r as a variable. Since two phases φ that have a difference of 2π between them is optically equivalent to each other, the cross section of an actual diffraction grating is obtained by transforming the curve such that the magnitude of shift of the phase φ falls within the range of zero through 2π. In FIGS. 3(a) and 3(b), the arrow points to a blazed shape obtained by the "shape transformation". The blazed shape consists of a number of portions (i.e., ring zones), of which the phase φ increases monotonically from zero to 2π with the distance r. In a range where the distance r is greater than zero, the phase φ becomes equal to zero at multiple points, which are the boundaries between the ring zones and where the steps are present. As can be seen from FIG. 3(a), the longer the distance r, the narrower the width of the ring zones (i.e., the interval between two adjacent steps).

The phase polynomial f(r) representing the curve shown in FIG. 3(a) is obtained by multiplying a polynomial representing an optical path difference by 2 π/λ. The optical path difference is given by the following polynomial F(r):

$$F(r) = a_1 r + a_2 r^2 + a_3 r^3 + \ldots + a_n r^n$$

where $a_1$, $a_2$, $a_3$ and so on are coefficients of the first, second, third and other orders.

Using this F(r), the phase polynomial f(r) can be represented by the following Equation (2):

$$f(r) = (2\pi/\lambda) \cdot F(r) \quad (2)$$
$$= (2\pi/\lambda) \cdot (a_1 r + a_2 r^2 + a_3 r^3 + \ldots + a_n r^n)$$

where λ is the designed wavelength, which is typically the center wavelength of the visible radiation range. According to the conventional design, the distance $r_1$, at which a step that is closest to the optical axis 12 is located, has a greater ring zone width than anywhere else as shown in FIG. 3(a). That is to say, a recess with the radius $r_1$ is formed around the optical axis 12.

If an optical adjustment layer of resin is formed on a diffraction grating with such a shape by a pad printing process, for example, a recess will be formed easily on the surface of the optical adjustment layer in the vicinity of the optical axis 12.

In this preferred embodiment, the optical path difference F'(r) is defined by the following equation:

$$F'(r) = \alpha + a_1 r + a_2 r^2 + a_3 r^3 + \ldots + a_n r^n$$

where α is a constant term that does not depend on the distance r. The phase polynomial f'(r) is represented by the following Equation (3):

$$f'(r) = (2\pi/\lambda) \cdot F(r) \quad (3)$$
$$= 2\pi\alpha/\lambda + (2\pi/\lambda) \cdot (a_1 r + a_2 r^2 + a_3 r^3 + \ldots + a_n r^n)$$

f'(r) is the sum of f(r) and a constant term 2πα/λ. Since f(0)=0, f'(0)=2πα/λ is satisfied. In this preferred embodiment, by adjusting the magnitude of α to the range of 3λ/8 through 7λ/8, f'(r) is defined to fall within the range of 3/4λ it through 7/4π. That is to say, the diffraction grating of this preferred embodiment has a height that is three-eighths through seven-eighths as large as the phase difference of 2π (i.e., the designed center wavelength) on the optical axis 12 (where r=0).

By subjecting this phase polynomial f'(r) to the shape transformation, the phase is adjusted to within the range of 0 through 2π at every distance r. The blazed waveform obtained by this shape transformation has a recess with a shorter radius in the vicinity of the optical axis 12 as shown in FIG. 3(b). In other words, the distance $r_1$ at which the step closest to the optical axis 12 is located is smaller in this preferred embodiment than in the conventional element shown in FIG. 3(a).

As described above, since the phase polynomial f'(r) has the constant term 2πα/λ that does not depend on the distance r, the distance r1 from the optical axis 12 to the closest step can be shortened as shown in FIG. 3(b). As a result, even if the optical adjustment layer of resin that covers such a diffraction grating is formed by a pad printing process, for example, the surface shape of the optical adjustment layer can still be maintained appropriately. Also, even if a lot of such diffractive optical elements are mass-produced, those diffractive optical elements will have a uniform shape with the surface shapes of their optical adjustment layer sufficiently matched to each other.

Figure 4:
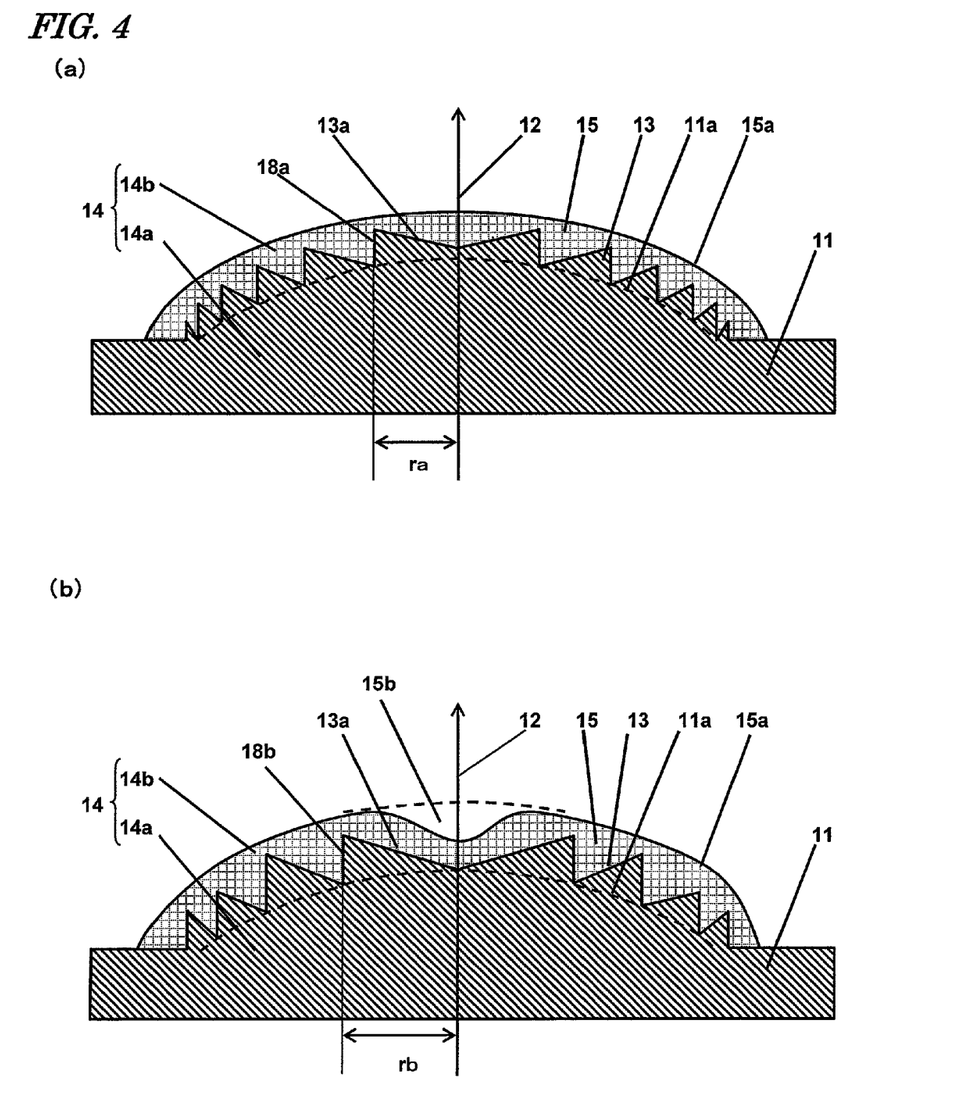

FIG. 4(a) illustrates a diffractive optical element that has been formed by the design process of this preferred embodiment, while FIG. 4(b) illustrates a diffractive optical element that has been formed by the conventional design process.

According to the conventional design process, as there is a longer distance rb from the optical axis 12 to the nearest step 18b, a dip 15b is made in a portion of the optical adjustment layer 15 in the vicinity of the optical axis 12 as shown in FIG. 4(b), thus deteriorating the optical properties of the diffractive optical element.

On the other hand, according to this preferred embodiment, as there is a shorter distance ra from the optical axis 12 to the nearest step 18a, the surface 15a of the optical adjustment layer 15 is shaped parallel to the first surface 11a of the lens body 11 in the vicinity of the optical axis 12 as shown in FIG. 4(a). As a result, white light can be condensed with high efficiency. In addition, since the variation in the thickness of the optical adjustment layer can be reduced in the vicinity of the optical axis, white diffractive optical elements with a significantly reduced variation in optical properties can be mass-produced.

Figure 5:
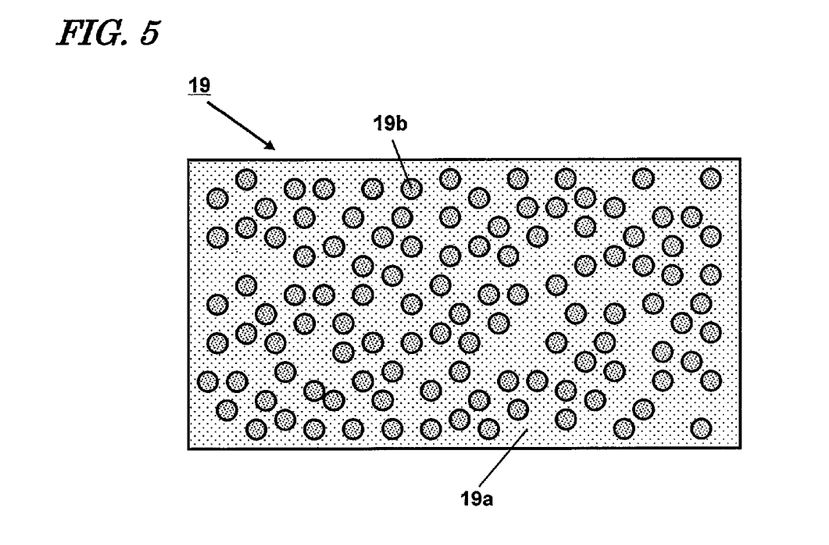
FIG. 5 illustrates an example of a resin material 19 that can be used effectively as a material for the optical adjustment layer 15 in a preferred embodiment of the present invention.

FIG. 5 illustrates an example of a resin material 19 that can be used effectively as a material for the optical adjustment layer 15. The resin material 19 has a structure in which inorganic particles 19b are dispersed in a resin base 19a. In this example, the resin base 19a may be made of a photocurable resin and the inorganic particles 19b may be inorganic nanoparticles, for example. The inorganic particles 19b may be made of at least one material that is selected from the group consisting of zirconium oxide, aluminum oxide and yttrium oxide.

By adopting such a configuration, an optical adjustment layer with a high refractive index and low wavelength dispersion can be formed on the diffraction grating with good mass productivity, thus realizing highly reliable diffractive optical elements.

Next, it will be described more specifically, based on the data of a sample white diffractive optical element actually made, how important it is to define the range of the constant term $2\pi\alpha/\lambda$ appropriately in the phase polynomial represented by Equation (3).

Figure 6:
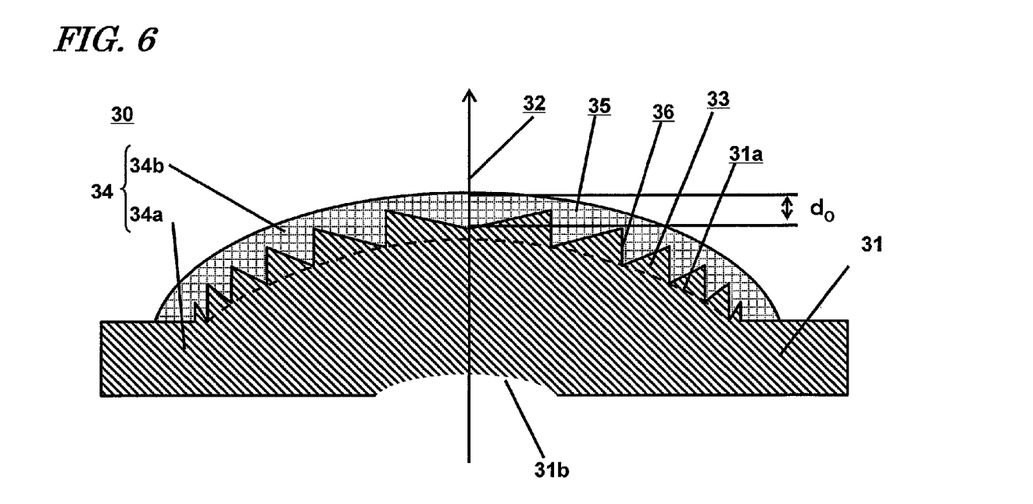
FIG. 6 is a schematic cross-sectional view illustrating a white diffractive optical element as a first specific preferred embodiment of the present invention.

FIG. 6 is a schematic cross-sectional view illustrating a white diffractive optical element 30 as a specific example of the present invention. As shown in FIG. 6, the white diffractive optical element 30 includes a lens body 31 and an optical adjustment layer 35 to cover a diffraction grating 33 that has been formed on the lens body 31. The first surface 31a of the lens body 31 has an aspheric surface that is raised in the direction in which the incoming light ray (not shown) travels along the optical axis 32.

As shown in FIG. 6, the second surface 31b of the lens body 31, opposite to the first surface 31a, has an aspheric surface that is depressed in the direction in which the incoming light ray travels along the optical axis 32. This white diffractive optical element 30 is made of resin materials 34. That is to say, the lens body 31 is made of a first material 34a, while the optical adjustment layer 35 is made of a second material 34b. The first material 34a is at least one material that is selected from the group consisting of polycarbonate resins, polystyrene resins, and fluorene polyester resins.

In this preferred embodiment, the first material 34a for the lens body 31 is polycarbonate with a d-line refractive index of 1.585 and an Abbe number of 28. On the other hand, the second material 34b for the optical adjustment layer 35 is obtained by dispersing zirconium oxide nanoparticles with a diameter of 3 nm to 10 nm in a resin that consists essentially of an acrylic UV curable resin with a d-line refractive index of 1.623 and an Abbe number of 42. To increase the degree of dispersion of the nanoparticles, this optical adjustment layer 35 also includes a resin-based dispersant and an UV curing initiator.

In the diffraction grating 33, the steps 36 have a height of 15 μm. In the visible radiation range of 400 to 700 nm, the diffractive optical element of this preferred embodiment achieves a first-order diffraction efficiency of 95% or more. The optical adjustment layer 35 has been formed so as to have a substantially uniform thickness of 30 μm over its aspheric surface.

In the white diffractive optical element 30 shown in FIG. 6, the shape of the diffraction grating 33 is represented by the phase polynomial f(r) that is Equation (2) mentioned above. In Equation (2), F is a polynomial representing an optical path difference, f is a phase polynomial, r is the radial distance from the optical axis, λ is the designed wavelength, and $a_1$, $a_2$, $a_3$ and so on are coefficients of suffix orders.

TABLE 1

| | |
|---|---|
| Half angle of view ω of lens | 35.4 degrees |
| Focal length f | 1.814 mm |
| F number | 4 |
| Effective radius of second surface | 511.5 μm |
| Distance t between lens' surfaces (distance on optical axis between the centers of two surfaces) | 0.8 mm |

TABLE 2

| | Aspheric coefficient of first surface | Aspheric coefficient of second surface |
|---|---|---|
| Radius of curvature | −2.42885 | −0.94866 |
| Conic coefficient | −1667.67 | −0.93859 |
| $4^{th}$-order coefficient | −6.65671 | 0.133211 |
| $6^{th}$-order coefficient | 183.2213 | −2.13077 |
| $8^{th}$-order coefficient | −2881.49 | 6.45317 |
| $10^{th}$-order coefficient | 17706.08 | −8.73971 |

TABLE 3

| diffraction order designed wavelength λ | First 540 nm |
|---|---|
| $a_2$ | −0.03284 |
| $a_4$ | −0.15759 |
| $a_6$ | 1.08081 |
| $a_8$ | −3.40485 |
| $a_{10}$ | 4.044572 |

Table 1 shows the lens-related numerical data about the white diffractive optical element 30. Table 2 shows the aspheric coefficients. And Table 3 shows the diffraction coefficients of the second surface of the lens body. The white diffractive optical element 30 has a designed center wavelength λ of 550 nm and covers the wavelength range of 400 nm through 700 nm.

The diffraction grating has 20 ring zones within the effective radius of 511.5 μm of the second surface 31b. If the $n^{th}$ step as counted from the optical axis is located at a radial distance $r_n$ from the optical axis, then the radial distance between the $n^{th}$ step and an adjacent step, which is located closer to the optical axis, will be as shown in the following Table 4:

TABLE 4

| Distance from optical axis to step | | Distance between adjacent steps | |
|---|---|---|---|
| r1 | 124.2 μm | Distance from optical axis | 124.2 μm |
| r2 | 171.8 | r2 − r1 | 47.6 μm |
| r3 | 206.9 | r3 − r2 | 35.1 |
| r4 | 236.0 | r4 − r3 | 29.1 |
| r5 | 261.3 | r5 − r4 | 25.3 |
| r6 | 284.2 | r6 − r5 | 22.9 |
| r7 | 305.2 | r7 − r6 | 21.0 |
| r8 | 324.9 | r8 − r7 | 19.7 |
| r9 | 343.5 | r9 − r8 | 18.6 |
| r10 | 361.2 | r10 − r9 | 17.7 |
| r11 | 378.2 | r11 − r10 | 17.0 |
| r12 | 394.5 | r12 − r11 | 16.3 |
| r13 | 410.2 | r13 − r12 | 15.7 |
| r14 | 425.3 | r14 − r13 | 15.1 |
| r15 | 439.9 | r15 − r14 | 14.6 |
| r16 | 454.0 | r16 − r15 | 14.1 |
| r17 | 467.7 | r17 − r16 | 13.7 |
| r18 | 481.0 | r18 − r17 | 13.3 |
| r19 | 493.9 | r19 − r18 | 12.9 |
| r20 | 506.5 | r20 − r19 | 12.6 |

The MTF characteristic, which is image capturing performance indices, of the lens of the white diffractive optical element 30 that was designed based on these data includes a spatial frequency of 80 lp/mm and 61.4% at an angle of view of zero degrees.

Figure 7:
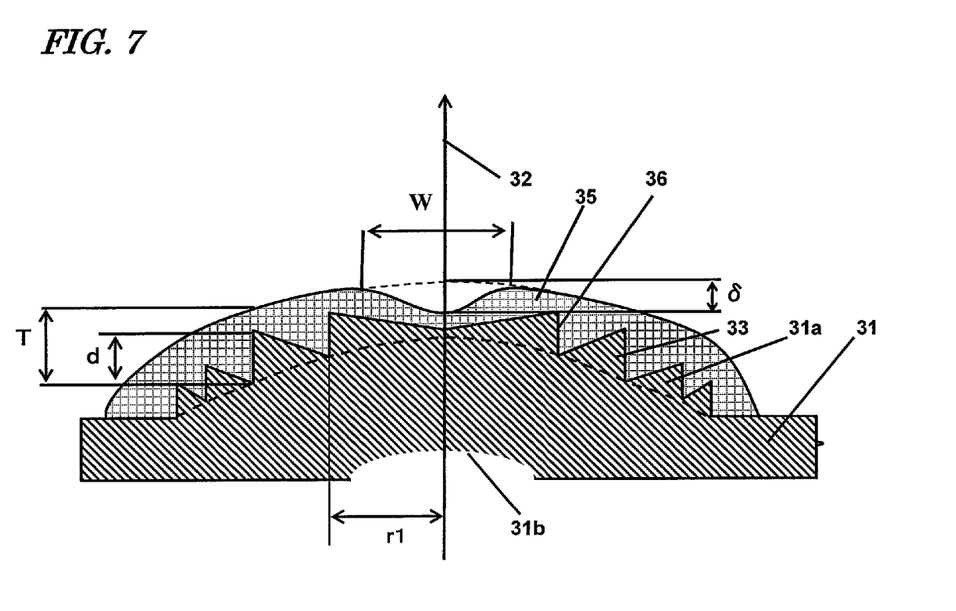
FIG. 7 illustrates a white diffractive optical element with a conical recess in a center portion of the film on the lens.

Next, the α value in the phase polynomial defining the shape of the diffraction grating 33 of the white diffractive optical element 30 was varied within a predetermined range. The present inventors checked the surface shape of the optical adjustment layer. As a result, we discovered that if the α value fell out of the predetermined range, a conical recess had been formed in a portion of the optical adjustment layer 35 at the center of the lens as shown in FIG. 7. Suppose the difference between the decreased thickness of the optical adjustment layer at the deepest point of the recess and the ideal (or designed) thickness is δ and the diameter of the recess is W as shown in FIG. 7.

The following Table 5 summarizes the relations between the α value, the radial distance from the optical axis and the evaluated MTF characteristic of the lens:

TABLE 5

| 1) if α = λ/4 | | |
|---|---|---|
| r1 = 108.3 μm | distance from optical axis: 108.3 μm | |
| r2 = 161.5 | r2 − r1 = 53.2 μm | |
| r3 = 198.8 | r3 − r2 = 37.3 | |
| δ = 4.5 μm | W = 160 μm | MTF: 50% |
| 2) if α = 3λ/8 | | |
| r1 = 99.3 μm | distance from optical axis: 99.3 μm | |
| r2 = 156.0 | r2 − r1 = 56.7 μm | |
| r3 = 194.6 | r3 − r2 = 38.6 | |
| δ = 3.0 μm | W = 140 μm | MTF: 58% |
| 3) if α = λ/2 | | |
| r1 = 89.1 μm | distance from optical axis: 89.1 μm | |
| r2 = 150.3 | r2 − r1 = 61.2 μm | |
| r3 = 190.3 | r3 − r2 = 40.0 | |
| δ = 0.5 μm | W = 20 μm | MTF: 61% |
| 4) if α = 3λ/4 | | |
| r1 = 63.6 μm | distance from optical axis: 63.6 μm | |
| r2 = 138.0 | r2 − r1 = 74.4 μm | |
| r3 = 181.3 | r3 − r2 = 43.3 | |
| δ = 0 μm (no recess) | W = 0 μm (no recess) | MTF: 61% |
| 5) if α = 7λ/8 | | |
| r1 = 45.2 μm | distance from optical axis: 45.2 μm | |
| r2 = 131.3 | r2 − r1 = 86.1 μm | |
| r3 = 176.6 | r3 − r2 = 45.3 | |
| δ = 0 μm (no recess) | W = 0 μm (no recess) | MTF: 60% |

As can be seen from Table 5, if α was 3λ/8, for example, the distance r1 from the optical axis to the diffraction grating step located closest to the optical axis was 108.3 μm, δ was 3 μm, and the width W was 140 μm. The thickness T was 30 μm and each diffraction grating step had a height d of 15 μm.

If α is equal to or greater than 3λ/8, then the recess to be formed in the optical adjustment layer will be too small to be a problem.

It should be noted that if α>7λ/8, then the distance from the optical axis to the first closest step was too short to get the die pressing done smoothly and to make a sample diffraction grating. That is to say, the closer to λ α got, the wider the interval between the first and second steps. As a result, the recess would be formed in the optical adjustment layer more easily and the image capturing performance would decline often.

Considering these results, it can be seen that good image capturing performance is achieved within the range of $3\lambda/8 \leq \alpha \leq 7\lambda/8$. Supposing the diffraction grating step has a height d where r=0, the height of the ring zone where r=0 is calculated by d·α/λ. If the latter height is $d_0$, then $d_0$ satisfies $3d/8 \leq d_0 \leq 7d/8$. A more preferred range of α is $\lambda/2 \leq \alpha \leq 7\lambda/8$. In that case, the height $d_0$ of the ring zone where r=0 satisfies $d/2 \leq d_0 \leq 7d/8$.

The present inventors also discovered via experiments that if δ in FIG. 7 was smaller than 3 μm, the image capturing performance deteriorated too little to cause a problem in practice. We also discovered that even if δ≧3 μm but if β in the following Equation (4) was equal to or smaller than 0.1, the image capturing performance also deteriorated too little to cause any problem in practice.

$$\beta = \delta \cdot W / \{4 \cdot (\text{maximum value of } \Delta r_n) \cdot (T-d)\} \quad (4)$$

In Equation (4), $\Delta r_n$ is the distance between the $(n-1)^{th}$ step and the $n^{th}$ step as counted from the optical axis and is given by $\Delta r_n = r_n - r_{n-1}$. It should be noted that $r_0 = 0$ in this case.

Embodiment 2

Hereinafter, an exemplary method of forming an optical adjustment layer 15 for the diffractive optical element 10 shown in FIG. 1 will be described with reference to FIGS. 8(a) through 8(c) and FIGS. 9(a) through (c), which are cross-sectional views illustrating respective manufacturing process steps to make the diffractive optical element 10 of this preferred embodiment.

Figure 8:
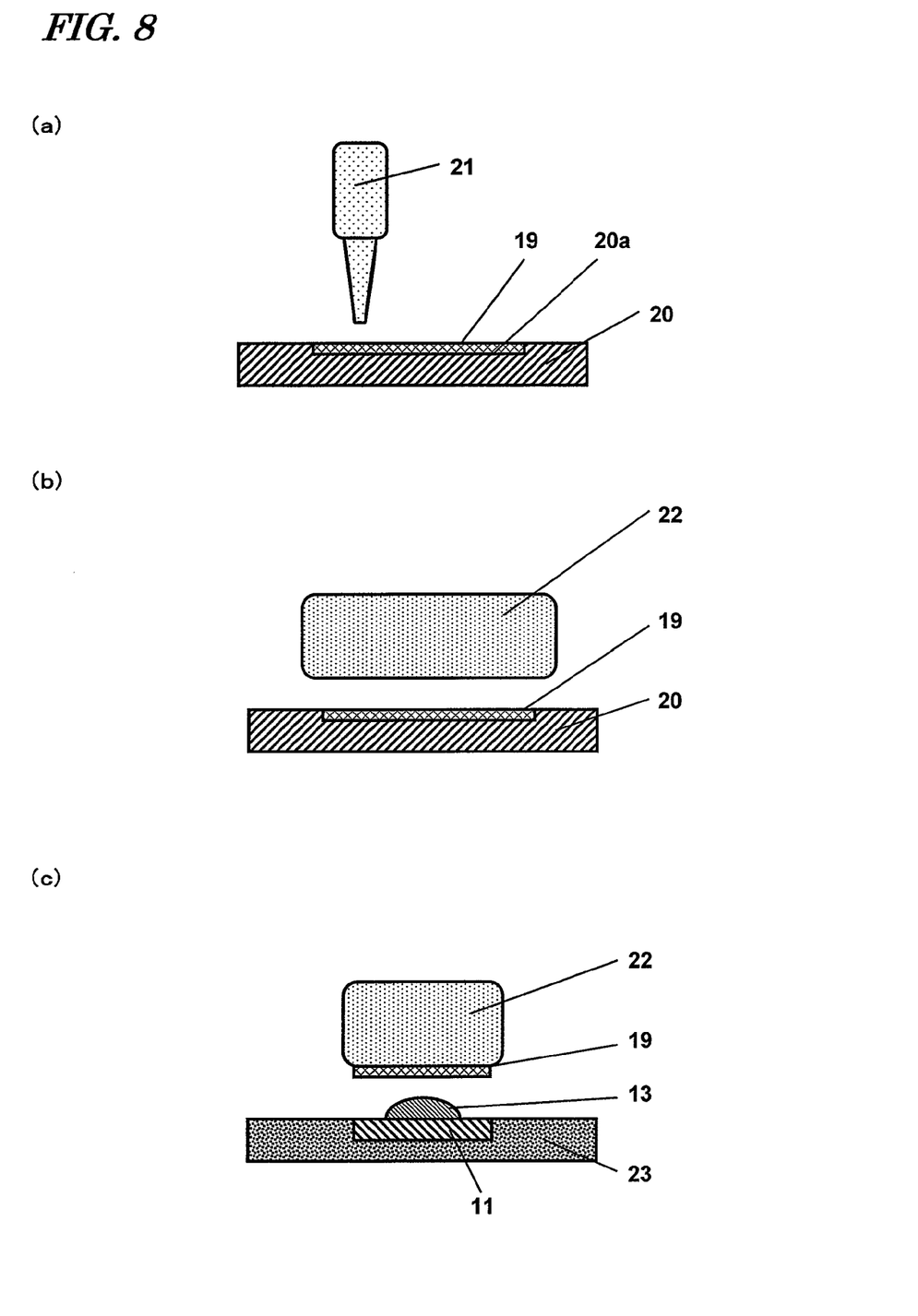
FIGS. 8(a) through 8(c) are schematic cross-sectional views illustrating the flow of the first half of the manufacturing process to make a diffractive optical element as a preferred embodiment of the present invention.

First of all, a plate 20 having a depression 20a on its upper surface is provided and a liquid resin material 19 is injected from a dispenser 21 into the depression 20a of the plate 20 as shown in FIG. 8(a). In this process step, the resin material 19 is stretched evenly so as to have a substantially uniform thickness. In this preferred embodiment, a photocurable resin such as a UV curing resin is used as the resin base 19a of the resin material 19 shown in FIG. 5 and inorganic nanoparticles of a zirconium oxide material are used as the inorganic particles 19b.

Next, as shown in FIG. 8(b), a pad 22 is brought close to the resin material 19 on the plate 20, thereby bonding the resin material 19 onto the principal surface of the pad 22.

Meanwhile, a lens body 11 with a diffraction grating 13 is provided and then fixed on a fixing jig 23 as shown in FIG. 8(c). In this process step, the surface of the lens body 11 with the diffraction grating 13 is exposed upward from the fixing jig 23. In this preferred embodiment, the lens body 11 is made of a polyolefin resin material, for example, and the diffraction grating 13 of the lens body 11 has a cross-sectional structure such as the one shown in FIG. 4(a).

Next, the pad 22 with the resin material 19 bonded on its principal surface is positioned right over the fixing jig 23 and the resin material 19 is pressed against the surface of the lens body 11 with the diffraction grating 13. In this process step, the optical property is optimized by adjusting the position where the resin material 19 is pressed against the lens body 11.

Figure 9:
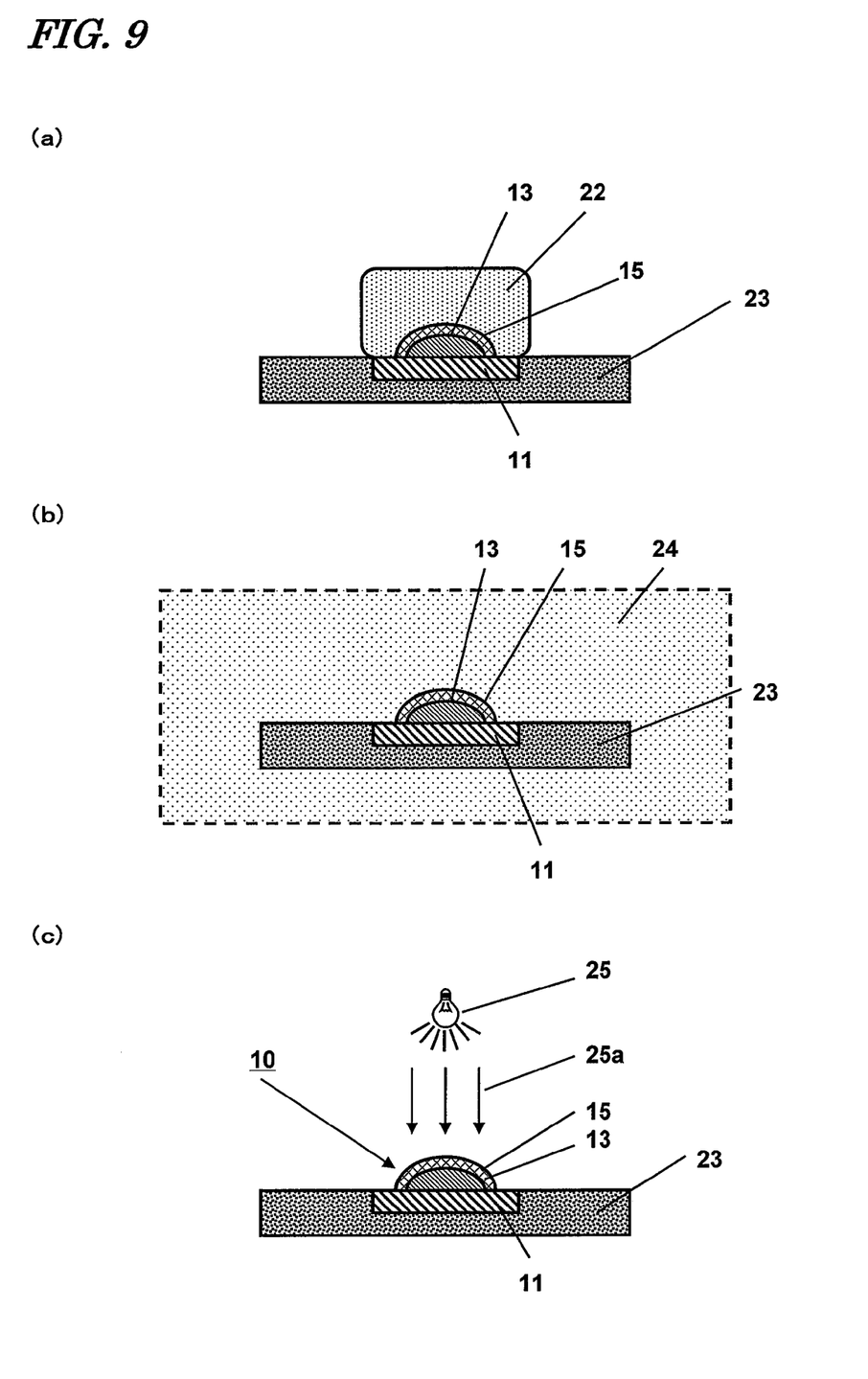
FIGS. 9(a) through 9(c) are schematic cross-sectional views illustrating the flow of the second half of the manufacturing process to make the diffractive optical element as the preferred embodiment of the present invention.

Subsequently, as shown in FIG. 9(a), the resin material 19 is stretched by using the elasticity of the pad 22 so as to cover the diffraction grating 13 of the lens body 11 with no gaps left and to contact with the diffraction grating 13 closely. In this manner, an optical adjustment layer 15 is formed.

Thereafter, the pad 22 is removed from the fixing jig 23 and then the diffractive optical element 10 that is still fixed on the fixing jig 23 is loaded into a constantly drying furnace, in which the diffractive optical element 10 is placed in a dry atmosphere 24 at about 100 to 150° C. and dried for approximately 12 hours. In this manner, the degree of close contact at the interface between the optical adjustment layer 15 and the diffraction grating 13 is increased and the resin materials that make the lens body 11 and the optical adjustment layer 15 are stabilized.

In this preferred embodiment, the optical adjustment layer 15 comes to have a greater refractive index than the lens body 11. After the drying process step is finished, the diffractive optical element 10 is irradiated with a UV ray 25a by a UV light source 25 as shown in FIG. 9(c). As a result, the entire optical adjustment layer 15, including the resin base 19a, is cured.

According to the method of this preferred embodiment, the diffraction grating 13 on the lens body 11 has the cross section shown in FIG. 4(a), and therefore, an optical adjustment layer 15 with an appropriate shape can be obtained without making a recess around the center of the optical adjustment layer 15.

INDUSTRIAL APPLICABILITY

The present invention provides a white diffractive optical element that can condense incoming light highly efficiently, thus realizing a diffractive optical element that can have a reduced weight and thickness and that can be mass-produced with increased reliability and at a reduced manufacturing cost. In addition, by using the diffractive optical element of the present invention, various kinds of mobile telecommunications devices and other IT-based consumer electronics devices can have their size, thickness and weight further reduced and can also be manufactured at a reduced cost and with increased reliability.

The invention claimed is:

1. A diffractive optical element comprising:
    a lens body with a blazed grating on an aspheric surface thereof; and
    an optical adjustment layer that covers the diffraction grating,
    wherein the lens body is made of a first material and the optical adjustment layer is made of a second material that has a higher refractive index than the first material, and
    wherein the diffraction grating has a number of ring zones that are arranged concentrically around an optical axis, where the height of each said ring zone with respect to the aspheric surface of the lens body is represented by an increasing function of a distance r from the optical axis, and
    wherein the increasing function is represented by a phase polynomial that uses the distance r as a variable and that has a magnitude of $3/4\pi$ to $7/4\pi$ when r=0.

2. The diffractive optical element of claim 1, wherein if the diffraction grating has a step height d, the height $d_0$ of the ring zone at the distance r=0 falls within range $3d/8 \leq d_0 \leq 7d/8$.

3. The diffractive optical element of claim 1, wherein the first material is a first resin material and the second material is a second resin material.

4. The diffractive optical element of claim 3, wherein the second material includes fine particles that are dispersed in the second resin material.

5. The diffractive optical element of claim 4, wherein the fine particles are inorganic particles and the second resin material is a photocurable resin.

6. The diffractive optical element of claim 5, wherein the inorganic particles are made of at least one material that is selected from the group consisting of zirconium oxide, aluminum oxide and yttrium oxide.

7. The diffractive optical element of claim 3, wherein the first material is at least one material that is selected from the group consisting of polycarbonate resins, polystyrene resins, and fluorene polyester resins.

8. The diffractive optical element of claim 1, wherein the aspheric surface is raised in a direction in which a light ray travels along the optical axis.

9. The diffractive optical element of claim 8, wherein the surface of the lens body without the diffraction grating is an aspheric surface that is depressed in the direction in which the light ray travels along the optical axis.

10. A method of making a diffractive optical element, the method comprising the steps of:
    providing a lens body that has an aspheric surface, on which a blazed grating has been formed, and that is made of a first resin material; and
    forming an optical adjustment layer on the diffraction grating by a pad printing process using a second resin material that has a higher refractive index than the first resin material,
    wherein the diffraction grating has a number of ring zones that are arranged concentrically around an optical axis, where the height of each said ring zone with respect to the aspheric surface of the lens body is represented by an increasing function of a distance r from the optical axis, and
    wherein the increasing function is represented by a phase polynomial that uses the distance r as a variable and that has a magnitude of $3/4\pi$ to $7/4\pi$ when r=0.

* * * * *